United States Patent

Pichat

[11] Patent Number: 5,387,739
[45] Date of Patent: Feb. 7, 1995

[54] TREATMENT OF MUNICIPAL WASTE ASH

[76] Inventor: Philippe Pichat, 18, rue des Tournelles, 75004 Paris, France

[21] Appl. No.: 876,018

[22] Filed: Apr. 28, 1992

Related U.S. Application Data

[63] Continuation-in-part of Ser. No. 853,178, Mar. 17, 1992, abandoned, Continuation-in-part of Ser. No. 498,081, Mar. 20, 1990, abandoned.

[30] Foreign Application Priority Data

Mar. 20, 1989 [FR] France .................. 89 03586

[51] Int. Cl.$^6$ .............................................. B09B 3/00
[52] U.S. Cl. .................... 588/257; 588/252; 106/705; 405/128
[58] Field of Search ............... 423/DIG. 18; 501/155; 405/128, 129; 588/252, 256, 257; 106/692, 693, 695, 705, 707, 789

[56] References Cited

U.S. PATENT DOCUMENTS

| | | | |
|---|---|---|---|
| 4,028,130 | 6/1977 | Webster et al. | 106/697 |
| 4,432,666 | 2/1984 | Frey et al. | 405/129 |
| 4,741,782 | 5/1988 | Styron | 106/706 |
| 4,812,169 | 3/1989 | Matsuura et al. | 106/15.05 |
| 5,037,286 | 8/1991 | Roberts | 425/222 |
| 5,073,197 | 12/1991 | Majumdar et al. | 106/692 |
| 5,150,985 | 9/1992 | Roesky et al. | 405/128 |

OTHER PUBLICATIONS

"Fly Ash Facts for Highway Engineers" US-DOT/FHWA Publication FHWA-DP-59-8, Jul. 1986, pp. 4 and 6.

*Primary Examiner*—Randolph A. Reese
*Assistant Examiner*—John Ricci
*Attorney, Agent, or Firm*—Browdy and Neimark

[57] ABSTRACT

Ash obtained from incineration of municipal waste is mixed with small quantities of water, from 10-35% by weight of the ash, and the product so formed is compacted and extruded. Where required, sufficient lime is added to raise the pH of the product from about 7.4 to about 11.6. The lime can be combined with a product containing silica and/or alumina. The solid products obtained are virtually insoluble in water and are substantially non-polluting.

8 Claims, No Drawings

TREATMENT OF MUNICIPAL WASTE ASH

The present application is a continuation in part of application Ser. No. 07/853,178, filed Mar. 17, 1992, now abandoned the entire contents of which are hereby incorporated by reference, which is a continuation in part of application Ser. No. 07/498,081 filed Mar. 20, 1990, now abandoned the entire contents of which are hereby incorporated by reference.

FIELD OF THE INVENTION

The present invention relates to the field of treating waste products. More specifically, the present invention is directed to the treatment of waste products such as ash from combustion or incineration of municipal waste to transform the ash into compact masses that trap toxic elements and products, including metals.

BACKGROUND OF THE INVENTION

The quantity of residue generated by the incineration of municipal waste is far from negligible. In France alone, about six million tons of municipal waste are incinerated, which results in the production of nearly two million tons of ash, which must be disposed of in ways that are not harmful to the environment.

Studies have shown that coal fly ash, which includes many very soluble metallic salts, is susceptible of treatment. However, the treatment for coal fly ash is quite different from the treatment of ash from incineration of municipal waste, as the compositions of the two products are quite different.

Ash from municipal waste is not to be confused with coal fly ash, which is a well-known waste material usually recovered from the stack gases of pulverized coal-burning furnaces. Coal fly ash is a finely-divided material including some unburned carbon, but mostly comprised of various silica, alumina and iron compounds present in a variety of forms, including finely divided spherical glassy materials.

Disposal of ash from municipal waste is complicated by several types of reactions that occur with this ash. There is a reduction of organic compounds, which provokes release of hydrogen sulfide. Additionally, there is a risk of solubilizing dioxins. The most toxic of the dioxins, 2,3,7,8 TCDD, which is found in trace amounts in residues of ash from incineration of municipal waste, is slightly soluble in water, but may be mobilized by nonpolar organic compounds, such as oils. There is, of course, always a risk of solubilizing heavy metal, which, although precipitated in the form of the hydroxides in the initial basic ash, can be redissolved when the pH of the ash is reduced, for example by leaching.

Municipal solid waste varies in composition by city, by season of the year, and by weather conditions. Many of the components of municipal solid waste can be burned to produce fuel. However, other than clinker and smoke purification of waste products, an incinerator produces a large quantity of ash in the form of fine particles that are generally trapped using electrostatic devices. Of course, the composition of this ash varies depending upon the types of waste materials, the equipment used, and the operation conditions. The components of municipal waste generally comprise household waste, including food waste, yard waste, glass, metal, paper, plastics and textiles, wood, leather, rubber, and other waste materials, and the ash formed by incineration of these materials contains residues from them.

For example, in the case of incineration of household garbage, one ash had the following approximate composition: 23% Si, 7% Al, 4% Fe, 1% Pb, 1.9% Zn, 8% Ca, 2.5% Mg, 0.3% Ba, 4% K, 3% Na, 0.7% Ti, 0.03% Cd, 0.3% Sn, 0.1% Cr, 1% Cl, 3% S, 3% Na, 3% N, 4% P, 5% organic carbon, and approximately 1% unburned materials.

Municipal waste ash that is stored in moist environments can generate considerable pollution due to leaching. In this way, for example, a representative sample having a pH of approximately 6.8 subjected to DIN standard 38414 salts out the following toxic elements by leaching, as expressed in parts per million: 6.3 ppm Pb, 0.2 ppm Cu, 60 ppm Cd, 900 ppm Zn, 0.2 ppm Fe.

Typical chemical compositions of coal fly ash are shown below:

| Compounds | Fly Ash Class | |
|---|---|---|
| | Class F | Class C |
| $SiO_2$ | 54.9 | 39.9 |
| $Al_2O_3$ | 25.8 | 16.7 |
| $Fe_2O_3$ | 6.9 | 5.8 |
| CaO | 8.7 | 24.3 |
| MgO | 1.8 | 14.6 |
| $SO_3$ | 0.6 | 3.3 |

Some processes have been proposed to insolubilize municipal waste ash from incineration, for example, by adding to it significant quantities of lime, cement or mixtures of cement and sodium silicate. The compounds produced by the use of such treatments are highly basic (pH generally greater than 12) and tend to solubilize amphoteric elements, in particular lead and zinc. Another problem may arise in the untimely production of hydrogen according to the reaction:

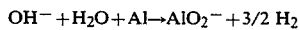

$$OH^- + H_2O + Al \rightarrow AlO_2^- + 3/2\, H_2$$

SUMMARY OF THE INVENTION

It is the primary object of the present invention to overcome deficiencies of the prior art treatment of municipal waste ash, such as those indicated above.

It is another object of the present invention to treat municipal waste ash by adding a small amount of water to the ash and then compacting or extruding the resultant product.

In order to prevent these problems due largely to the highly basic nature of the municipal waste ash treated, the present inventor has conducted numerous experiments intended to transform municipal waste ash into products that are virtually insoluble in water and are easy to aggregate into masses that are inert, non-toxic, or otherwise suitable for use in concrete.

DETAILED DESCRIPTION OF THE INVENTION

The present inventor has made the surprising discovery that products having the aforementioned characteristics could be produced by adding a small amount of water to the municipal waste ash, i.e., sufficient water to produce a mortar or paste. It is preferred to make a mass that is homogeneously moistened with water.

Ash obtained from incineration of municipal waste generally contains the following principal constituents, wherein the quantities are expressed in grams of constituent per kilogram of municipal waste ash:

| | |
|---|---|
| SiO₂ | 220–320 |
| CaO | 62–115 (Calculated as Ca) |
| Al₂O₃ | 60–120 (Al) |
| Fe₂O₃ | 25–74 (as Fe) |
| MgO | 12–30 |
| Na₂O | 40–269 (as Na) |
| K₂O | 10–44 (as K) |
| Mn | 1.8–1.9 |
| C (unburned) | 24–39 |
| P | 1–12 |
| S (total) | 20–48 |
| Cl | 40–104 |
| Zn | 13–39 |
| Cd | 0.2–0.7 |
| Mg | 0.0005–7 |
| Pb | 1.4–12 |
| Cu | 0.1–2 |
| Ni | 0.2–0.7 |
| Sn | 0.34–1.6 |
| Cr | 0.2–2 |
| Ba | 1–3 |

The constituents of ash obtained from incineration of municipal waste differs very greatly from the constituents of coal fly ash, which is generally obtained from burning coal. Typical compositions of municipal waste ash and coal fly ash are shown below:

TABLE 2

| | Elemental Composition of Materials, in mg/kg | | | | | | | | |
|---|---|---|---|---|---|---|---|---|---|
| | Na | K | Ca | Cl⁻ | Cr | Cu | Cd | Zn | Pb |
| Coal Fly Ash | 6908 | 26876 | 6417 | 44 | 203 | 203 | 2 | 530 | 283 |
| Waste Ash | 269345 | 39289 | 73939 | 104900 | 238 | 108 | 415 | 29153 | 1071 |

To obtain an appropriate moistening, the municipal waste ash can circulate in a mixing machine or on a conveyor belt onto which at least a part of the required water is sprayed. This quantity of water generally varies between the limits of about 10 to about 35% of the weight of the municipal waste ash, but generally is in the range of about 10 to about 18%.

According to one embodiment of the present invention, instead of using treated water such as municipal water supplies, non-purified water can be used, such as surface or underground water, effluents sludge from water purification stations or leaching products from waste outlets.

After treatment of the municipal waste ash, the mixture no longer emits dust and is carefully compacted into building blocks or other forms, for example, by one of the machines used in public works. In one embodiment of the invention, these mixtures can also be shaped by extrusion.

During moistening of the municipal waste ash, and through a variety of analyses, especially X-ray diffraction, it was found that the water added to the municipal waste ash behaved like a true reagent, notably forming gehlenite of the formula $(CaO)_2.Al_2O_3.SiO_2.8H_2O$ and aluminate, $(CaO)_4.Al_2O_3.13H_2O$.

An experiment was conducted to determine the amount of leaching from the municipal waste ash treated according to the present invention. According to the German standard DIN 38414, municipal waste ash having a pH of approximately 7.6 treated according to the present invention exhibits considerably less leaching than municipal waste ash which is untreated. The results of this experiments are summarized in Table 1.

TABLE 1

| Metals | Pb | Cu | Cd | Zn | Fe | Water:Ash ratio |
|---|---|---|---|---|---|---|
| Before treatment | 6.3 | 0.2 | 60 | 900 | 0.2 | 0 |
| After treatment | 0.4 | <0.1 | 1.5 | 0.1 | 0.30 |
| | 0.35 | <0.1 | | 0.1 | 0.1 | 0.15 |

The values indicated above are expressed in ppm of metals.

As one can readily observe, a low water/municipal waste ash ratio promotes the fixation of pollutant elements. This ratio generally corresponds to a minimum of about 0.13 to about 0.14, but can be lowered slightly by using liquefying agents such as lignosulfonates.

It was also found that, in fairly frequent cases, in which acidic municipal waste ash is involved, that the results after leaching, as well as the propensity to produce hard masses of waste materials, were further improved when a small quantity of lime was added to the water so as to obtain a maximum pH of approximately 11.6. Moreover, a silica- and/or alumina-based product can be added to the lime.

The examples below illustrate these different improvements according to the present invention.

Addition of Lime (a) Thirty kg of water, into which 0.03 kg (0.1%) of quick lime (CaO) had been dispersed, was added to 158 kg of ash obtained from incineration of household garbage. After compacting, a material was obtained having a very high level of cohesion, and which yielded the following leaching results:

| pH | Pb | Cu | Cd | Zn | Fe | Water/Waste ash |
|---|---|---|---|---|---|---|
| 9 | <0.4 | <0.1 | 0.5 | 0.2 | 0.1 | 0.19 |

(b) Thirty kg of water into which 0.183 (0,137%) of CaO had been dispersed was added to 133.3 kg of waste ash obtained from incinerating household garbage. After the mixture was compacted, a material was obtained which had superior cohesion to the materials obtained in test (a), above, and which had slightly lower leaching levels in the case of cadmium.

| Initial pH | Pb | Cu | Cd | Zn | Fe | Water/waste ash |
|---|---|---|---|---|---|---|
| 11.5 | <0.4 | <0.1 | 0.1 | 0.1 | 0.1 | 0.22 |

After 20 days, the resistance of the material to compression reached 7 megaPascal (MPa).

(c) In this example, the lime added came from incineration smoke purification waste products (DEF). Fifty kg of water to which 7 kg of DEF containing approximately 30.5% lime by weight, part of which was in carbonated form) was dispersed, was added to 180 kg of ash obtained from incineration of household garbage. The material obtained had a condition as good as the product in example (b) above, and which yielded the following results in terms of leaching, with elements expressed in terms of ppm.

| Initial pH | Pb | Cu | Cd | Zn | Fe | Al | Water:ash + DEF |
|---|---|---|---|---|---|---|---|
| 7.6 | 0.3 | <0.1 | 0.15 | 0.04 | <0.1 | 1.5 | 0.267 |

Addition of a Source of Lime and Silica

Two kg of CaO and 3 kg of coal fly ash (as a source of silica) were dispersed in 30 kg of water. This dispersion was added to 100 kg of ash obtained from incineration of household garbage. The results after leaching were very good, as shown below:

| Initial pH | Pb | Cu | Cd | Zn | Fe | Al | Water/ash + CaO + Coal Ash |
|---|---|---|---|---|---|---|---|
| 10.3 | 0.1 | <0.1 | <0.1 | <0.1 | <0.1 | 1 | |

Addition of a source of lime and aluminum

We added 30 kg of purification station effluents into which had been dispersed 8 kg of high-alumina cement containing 38% CaO and 39% $Al_2O_3$, to 158 kg or household garbage FA. After compacting, the material had a good level of cohesion and excellent resistance to compression. The results after leaching are summarized below:

| Initial pH | Pb | Cu | Cd | Zn | Fe | Water/ash + additives |
|---|---|---|---|---|---|---|
| 9 | 0.4 | 0.1 | <0.1 | 0.1 | 0.1 | 0.18 |

In practice, the addition of lime corresponds to a range of approximately 0.05 to 2 parts by weight per 100 parts by weight of municipal waste ash to be treated.

As noted in the examples above, the lime can be composed of quick lime or dead lime, or any other source of lime such as high-alumina cement, residues from acetylene production, and the like. The silica added can be fossil silica (diatomite), ground silica, clay, fly ash from coal, ground pozzolana, asbestos waste materials, residues from the production of ferrosiliciums, and the like. A wide variety of sources of aluminum can be used, such as, for example, red clay used for the extraction of aluminum, in addition to high-alumina cements.

The foregoing description of the specific embodiments will so fully reveal the general nature of the invention that others can, by applying current knowledge, readily modify and/or adapt for various application such specific embodiments without departing from the generic concept, and, therefore, such adaptations and modification should and are intended to be comprehended within the meaning and range of equivalents of the disclosed embodiments. It is to be understood that the phraseology or terminology employed herein is for the purpose of description and not of limitation.

What is claimed is:

1. A process for treating ash from incineration of municipal waste to produce products which are virtually insoluble in water and which are non-pollutants consisting essentially of adding to the ash from 10–35% by weight of the ash of water and adding lime in an amount of from about 0.005 to about 2 parts per 100 parts by weight of the ash, and compacting the product obtained.

2. The process according to claim 1 wherein sufficient lime is added to the water to bring the pH of the product to a value between about 7.4 and 11.6.

3. The process according to claim 2 wherein the lime is combined with a substance selected from the group consisting of silica, alumina, and mixtures thereof.

4. The process according to claim 3 wherein the sources of lime, silica and alumina are selected from waste products obtained from the production of acetylene, ferrosiliciums, red clay, and smoke purification.

5. The process according to claim 1 wherein at least part of the water is supplied by spraying water onto the ash.

6. A process for trapping and preventing escape of toxic metals in ash from incineration of municipal waste consisting essentially of mixing from about 10 to about 35% by weight of water based upon the weight of said ash, with said ash, and effecting reaction between said water and said ash to produce a product containing substantial quantities of gehlenite and aluminate; adding lime in an amount of from 0.05 to about 2 parts per 100 parts by weight of said ash to the product; and compacting the product thus obtained.

7. The process according to claim 6 wherein sufficient lime is added to maintain the pH from about 7.4 to about 11.6.

8. The process according to claim 6 wherein said lime is combined with a material selected from the group consisting of silica, alumina, and mixtures thereof.

* * * * *